Jan. 5, 1932.  J. F. O'BRIEN  1,839,583
AUTOMOBILE DOOR RETAINER
Filed Oct. 11, 1929
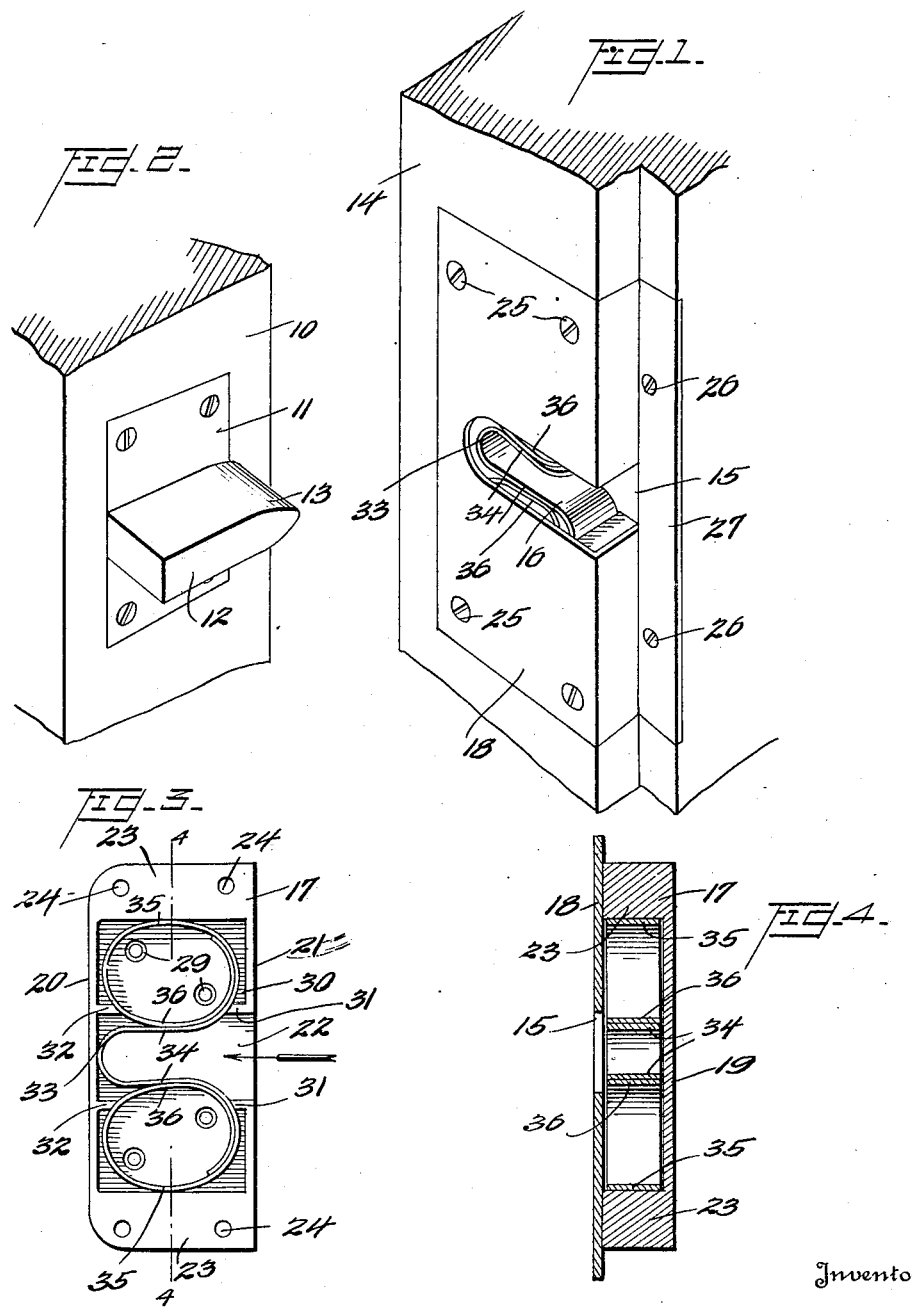
Inventor
Joseph F. O'Brien
By Watson, Coit, Morse & Grindle
Attorney Patented Jan. 5, 1932

1,839,583

UNITED STATES PATENT OFFICE

JOSEPH F. O'BRIEN, OF NEW YORK, N. Y.

AUTOMOBILE DOOR RETAINER

Application filed October 11, 1929. Serial No. 398,974.

This invention relates to automobile door retainers or what are generally known in the art as "dove-tails".

It is a general object of the present invention to provide a novel and improved type of dove-tail for automobile doors.

The essential feature of the present invention resides in the provision of a unique spring member which takes the place of the customary rubber buffer blocks and their metal protecting sheathing.

The important features of the invention will be recognized by those skilled in this particular art upon a consideration of the accompanying drawings and following specification wherein is disclosed a single exemplary embodiment of the present invention with the understanding that such changes may be made therein as fall within the scope of the appended claims without departing from the spirit of the invention.

In said drawings:

Figure 1 is a perspective view of an automobile door frame with the device of the present invention applied thereto;

Figure 2 is a perspective view of the co-operating part mounted on the edge of the door;

Figure 3 is a plan view of the device of Figure 1 with the cover plate removed; and Figure 4 is a section on line 4—4 of Fig. 3.

The doors of closed automobile bodies are almost universally provided with what are known as "dove-tails". The doors are fitted to have considerable clearance in the frame and are held from distortion, resulting from bounces and shocks, to the extent that the door may hit the frame, by means of the so-called "dove-tails" which comprise a wedge-like part usually arranged on the edge of the door and having the axis of the wedge transverse to the car when the door is closed and a member on the frame having a slot to receive the wedge and provided with friction parts entering the slot from the sides to engage the wedge and hold the door from moving vertically in respect to the frame. At the same time the two parts coming together frictionally absorb some of the energy of movement of the door to prevent it from slamming.

Heretofore dove-tails have been built almost universally in accordance with the disclosure in my Patent No. 1,098,393, for "buffer for automobile doors", dated June 2, 1914, in which the part projecting into the path of the wedge was a metal strip backed by a rubber block. The rubber provided the resilience, and the metal protected the rubber from wear. These devices are not only expensive to manufacture by reason of the rubber used therein but are subject to aging when the rubber becomes more or less hardened and partially compressed so that, after the car is several years old, the dove-tails lose their effectiveness and the doors may rattle. They are, however, seldom replaced since most people do not realize the difficulty and do not care to go to the expense of providing new ones. The present invention contemplates an improvement on the devices of the patent mentioned above in which the rubber blocks are entirely eliminated, and the necessary resilience and buffing action is provided entirely by a spring formed solely of metal.

Referring to the drawings, there is shown in Figure 2 the edge 10 of an automobile door in which is sunk the plate 11 carrying the wedge member 12 having the tapered forward edge 13. In Figure 1 is shown the edge 14 of a door frame having recessed therein the co-operating part of the dove-tail construction having therein the slot 15 into which the wedge is adapted to pass as the door is closed. Extending into the slot from above and below are the spring parts, generally designated by the reference character 16, which are sufficiently close together to require that they be expanded by the wedge as it enters in order that they may frictionally engage it. The part recessed in the door is in three pieces: the frame member 17 shown in Figure 3, the spring part 16, and the cover plate 18 shown in Figures 1 and 4.

The frame part may be a casting or stamping having preferably a flat bottom 19, a rear wall 20, and a forward wall 21 in two parts to provide the opening or slot 22 which comes beneath the slot 15 in the cover plate. The end walls 23 are shown as quite thick although this is not necessary. In the present instance they are drilled and tapped as at 24 to receive the fastening screws 25 which hold the cover plate in position. Additional fastening screws 26 in the flange 27 on the cover plate are received into the wood or metal of the frame to further reinforce the connection between the dove-tail and the frame. Holes 29 may be provided in the bottom plate 19 for the passage of screws to secure the base part in position on the frame.

Beside the slot 22, which extends through the front wall and to the rear wall of the frame member, are the two recesses 30 formed by means of the partial walls 31 and 32 extending along the slot, respectively, from the front wall 21 and the rear wall 20 toward each other and forming parts of the walls of the slot 22.

The spring member which forms the buffer is composed of a single strip or strap of spring steel or other suitable spring material which may be treated against rusting if desired. The middle section of this long strap is bent to form a U having a bottom or curved portion 33, the arm portions 34, and the loop portions 35 which extend from the ends of the arms of the U. These loop portions make somewhat more than 90° in excess of a full closed loop, as clearly shown in Figure 3, so that the arm portions 34 are reinforced or backed up by the inner turn portions 36. Preferably the loops are circular in form, but the shapes of the recesses 30 are such that when the spring is positioned in the base member, these loops must be compressed to an elliptical form. The parts of the loops remote from the arms 34 of the U are against the end walls 23 of the base member which act as abutments, and the portions of the loop on either side of the section 36 engage the sloping ends of the short wall sections 31 and 32, which permits a portion of the loop to extend into the slot. Each loop is compressed between the end wall 23 and its bearing portions on the walls 31 and 32. The space between the arms 34 of the U is less than the thickness of the wedge member 12.

From a consideration of Figure 3, it will be seen that when the wedge member is forced into position between the arms 34, pressure will be exerted which will in the upper loop tend to cause it to travel in a counter-clockwise direction and wind itself up in order that it can be compressed in the space provided for the same in the compartment 30. This applies extra tension to the spring and results in a resisting effort to the entrance of the wedge which is just what is required. Steel or other spring material, as is well-known, has more life than rubber and can be compressed throughout a greater distance with the use of less effort, and therefore, by a careful design of the spring, the present device can be made not only more efficient than a new dove-tail using rubber blocks, but can be made to maintain substantially this same efficiency throughout the life of the vehicle to which it is applied. The cover plate merely serves to provide a neat finish and to hold the spring in its respective compartments. It should be noted that the bend 33 of the U abuts the back wall 20 of the base member so that there is no movement as the dove-tail is inserted in the direction of the arrow shown in Figure 3.

Having thus described the invention, what is claimed as new and desired to be secured by Letters Patent is:

1. In a buffer for use at the free edge of a door or the like, the combination of two completely closed spring loops oppositely disposed, means supporting said loops remote from their facing sides, means to cooperate with said loops to yieldingly engage the same and be held therebetween, and a spring section connecting said loops.

2. A buffer for doors comprising the combination of two independently supported parts, one of said parts having a transverse groove and a spring member bordering three sides of said groove, the other part having a projection adapted to operate in the groove and engage between two parts of said spring member, and extensions from the ends of said spring forming loops reinforcing the portions of the spring engaging said projection.

3. A buffer for doors comprising the combination of two independently supported parts, one of said parts having a U-shaped spring member thereon, the other part having a wedge-like projection adapted to operate between the arms of said U, each arm of said U being extended to form a closed loop behind the arm to reinforce the same.

4. A buffer for doors comprising the combination of two independently supported parts, one of said parts having a U-shaped spring member thereon, the other part having a wedge-like projection adapted to operate between the arms of said U, each arm of said U being extended to form a closed loop behind the arm to reinforce the same, and means on said first mentioned part forming an abutment for each loop remote from the arm of the U whereby the diameter of each loop transverse to the line of movement of the wedge like projection is shortened when the wedge is inserted.

5. A buffer for doors comprising the combination of two independently supported parts, one of said parts having a U-shaped spring member thereon, the other part having a wedge-like projection adapted to operate between the arms of said U, each arm of said U being extended to form a closed loop behind the arm to reinforce the same, means on said first mentioned part placing each loop in compression in a direction transverse to the longitudinal axis of the U, and means restraining movement of the loops toward the U.

6. A buffer for doors comprising the combination of two independently supported parts, one of said parts having a U-shaped spring member thereon, the other part having a wedge-like projection adapted to operate between the arms of said U, each arm of said U being extended to form a closed loop of more than a full turn of material behind the arm to reinforce the same.

7. A buffer for doors comprising the combination of two independently supported parts, one of said parts having a U-shaped spring member thereon, the other part having a wedge-like projection adapted to operate between the arms of said U, each arm of said U being extended to form a loop of more than a full turn of material behind the arm to reinforce the same, and means restraining each loop at three points so that pressure on the arms of the U causes the material of each loop to curl up to reduce the size of the loop.

In testimony whereof, I hereunto affix my signature.

JOSEPH F. O'BRIEN.